United States Patent [19]

Cummins

[11] Patent Number: 5,381,679
[45] Date of Patent: Jan. 17, 1995

[54] VEHICLE STEERING WHEEL ANTI-THEFT DEVICES

[76] Inventor: Ian G. Cummins, 16 Statice Avenue, Hollywell Qld 4216, Australia

[21] Appl. No.: 81,366
[22] PCT Filed: Feb. 24, 1992
[86] PCT No.: PCT/AU92/00068
§ 371 Date: Jun. 30, 1993
§ 102(e) Date: Jun. 30, 1993
[87] PCT Pub. No.: WO93/05988
PCT Pub. Date: Apr. 1, 1993

[30] Foreign Application Priority Data

Sep. 19, 1991 [AU] Australia ............... PK8448
Sep. 30, 1991 [AU] Australia ............... PK8612
Oct. 11, 1991 [AU] Australia ............... PK8826
Oct. 21, 1991 [AU] Australia ............... PK9004
Nov. 15, 1991 [AU] Australia ............... PK9519

[51] Int. Cl.⁶ ............... B60R 25/02
[52] U.S. Cl. ............... 70/209; 70/226; 70/238
[58] Field of Search ............... 70/209, 226, 238, 211, 70/212, 225, 226, 237

[56] References Cited

U.S. PATENT DOCUMENTS

| | | | |
|---|---|---|---|
| 3,245,239 | 4/1966 | Zaidener | 70/202 |
| 3,664,164 | 5/1972 | Zaidener | 70/202 |
| 3,690,131 | 9/1972 | Davis | 70/238 X |
| 4,103,524 | 8/1978 | Mitchell et al. | 70/209 |
| 4,660,394 | 4/1987 | Wu | 70/238 X |
| 4,738,127 | 4/1988 | Johnson | 70/209 |
| 4,970,884 | 11/1990 | Solow | 70/209 |
| 4,974,433 | 12/1990 | Wang | 70/237 X |
| 5,014,529 | 5/1991 | Wu | 70/209 |
| 5,031,429 | 7/1991 | Wang | 70/209 |
| 5,040,388 | 8/1991 | Chen | 70/209 |
| 5,121,617 | 6/1992 | Chen | 70/238 X |
| 5,138,853 | 8/1992 | Chen | 70/209 |
| 5,165,264 | 11/1992 | Chen | 70/209 |
| 5,179,849 | 1/1993 | Wang | 70/209 |
| 5,197,308 | 3/1993 | Pazik | 70/226 X |
| 5,230,232 | 7/1993 | Yang | 70/209 |

FOREIGN PATENT DOCUMENTS

| | | |
|---|---|---|
| 1584788 | 11/1988 | Australia . |
| 34804/89 | 11/1989 | Australia . |
| 64545/90 | 5/1992 | Australia . |
| 2718291 | 10/1978 | Germany ............... 70/211 |
| 1127524 | 9/1968 | United Kingdom . |
| 2039840 | 8/1980 | United Kingdom . |

*Primary Examiner*—Lloyd A. Gall
*Attorney, Agent, or Firm*—Kimmel, Crowell & Weaver

[57] ABSTRACT

An anti-theft device (40) for attachment to a vehicle steering wheel having an elongated tubular member (451), a sleeve (45) slidable along the member (41) and an arm (51) telescopically received in the member (41) and coupled to the sleeve (45). The sleeve (45) carries a locking device (47) which engages apertures (43) to lock the sleeve (45) to the member (41) in a position where the arm (51) extends from the member (41). The member (41) and sleeve (45) carry hooks (42) and (49) to engage the rim of a steering wheel and the arm (51) limits rotation of the steering wheel.

23 Claims, 8 Drawing Sheets

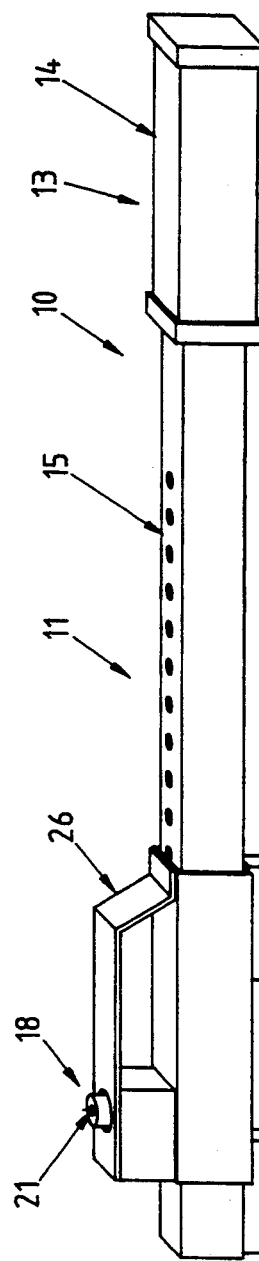
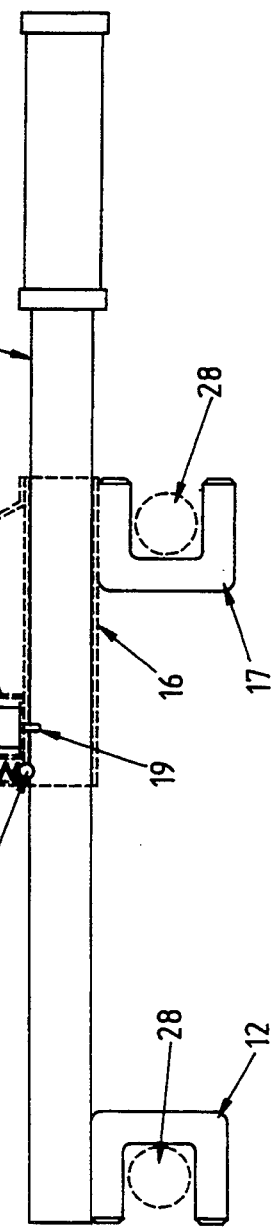
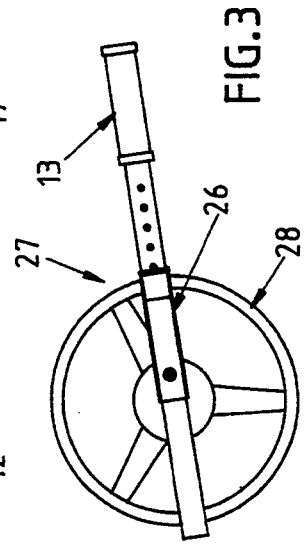
FIG.1
FIG.2
FIG.3

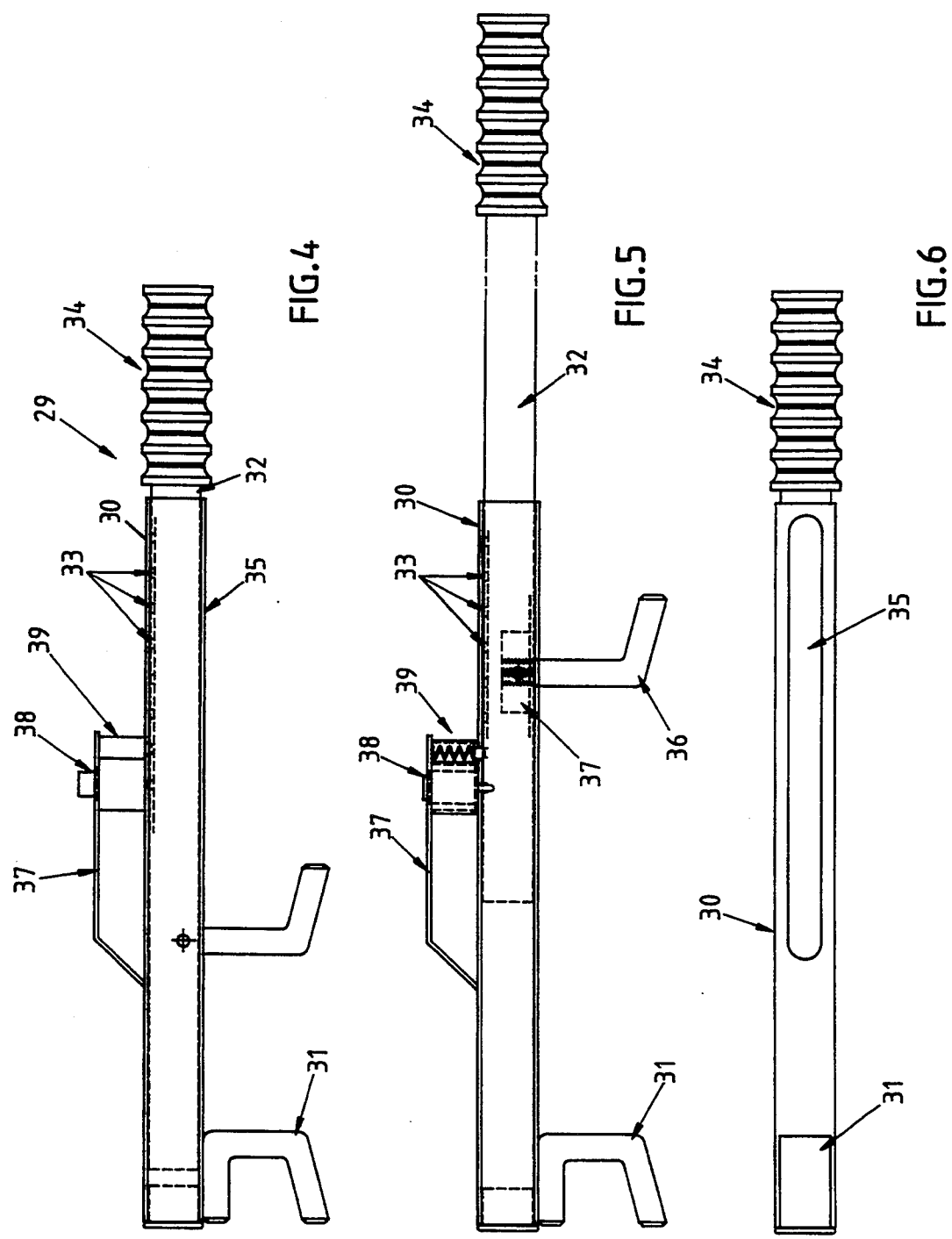

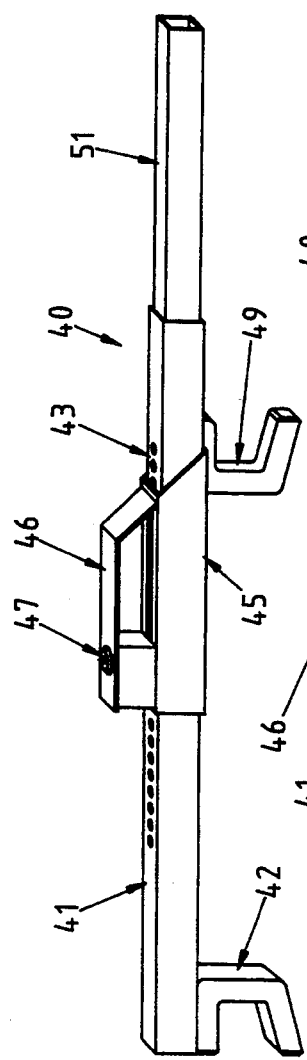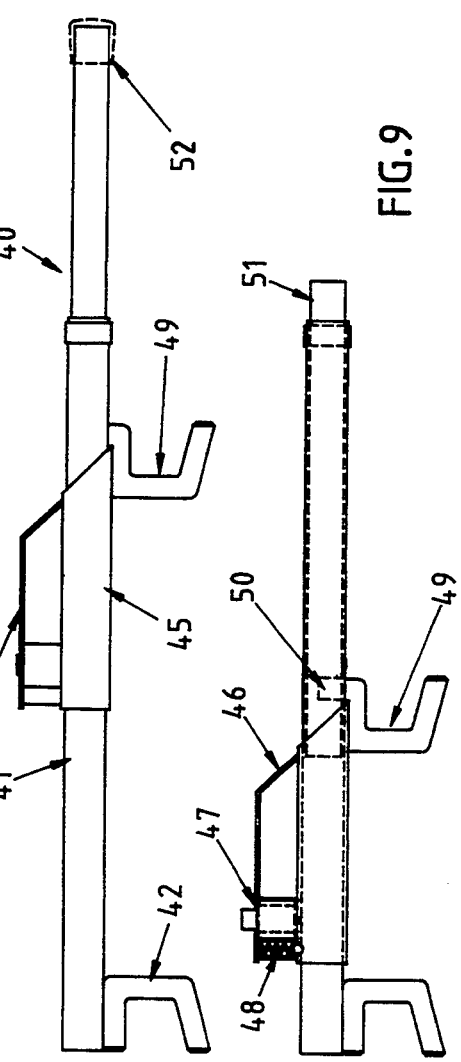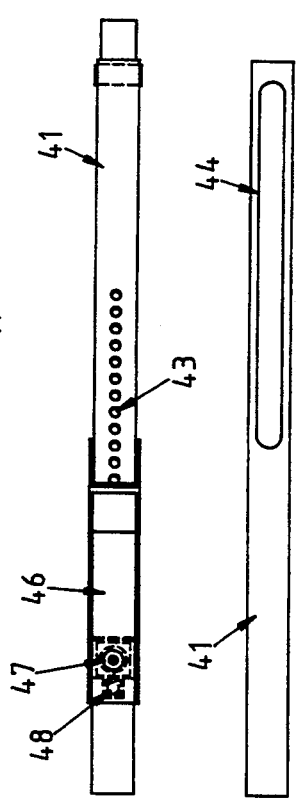

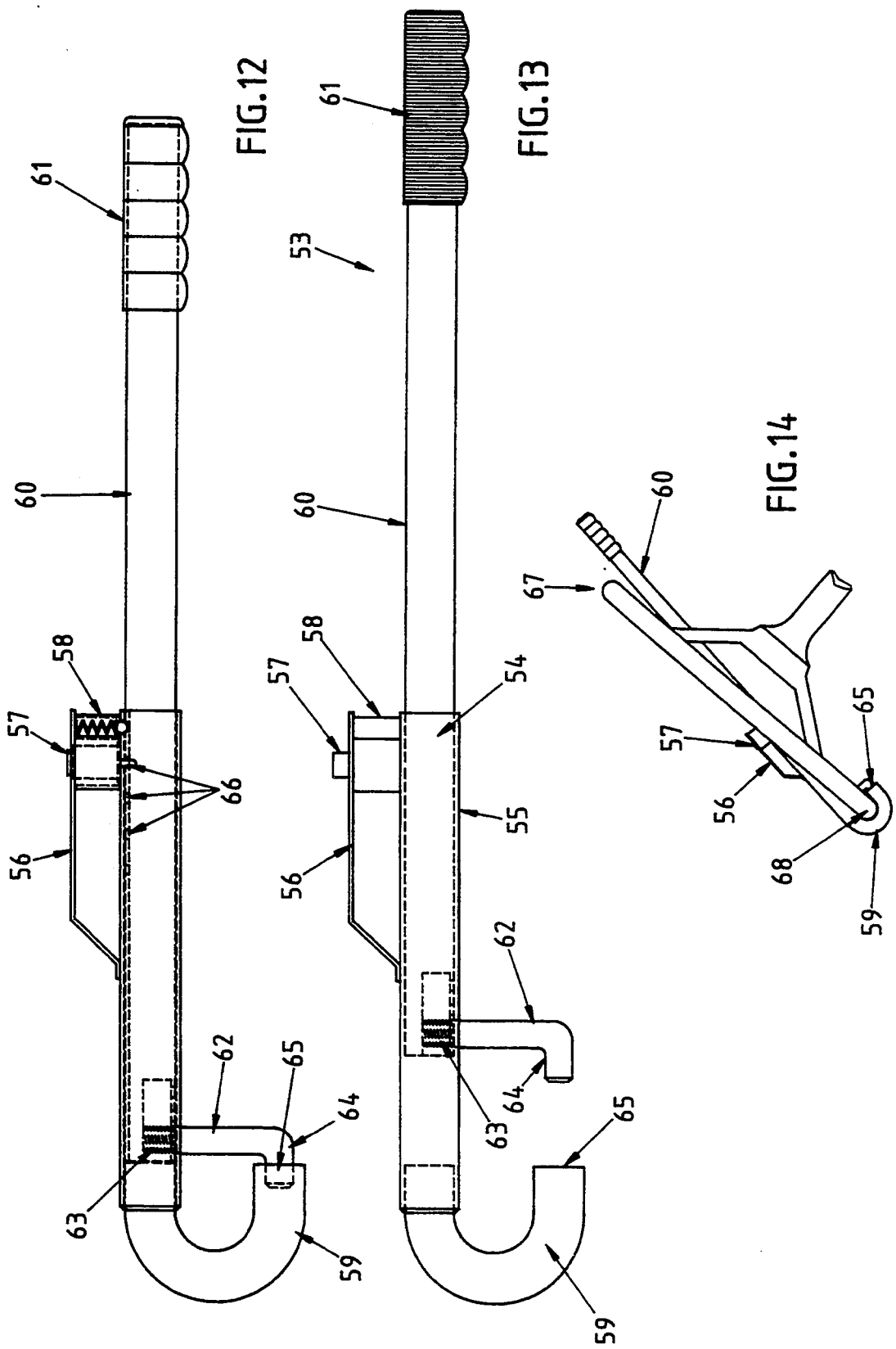

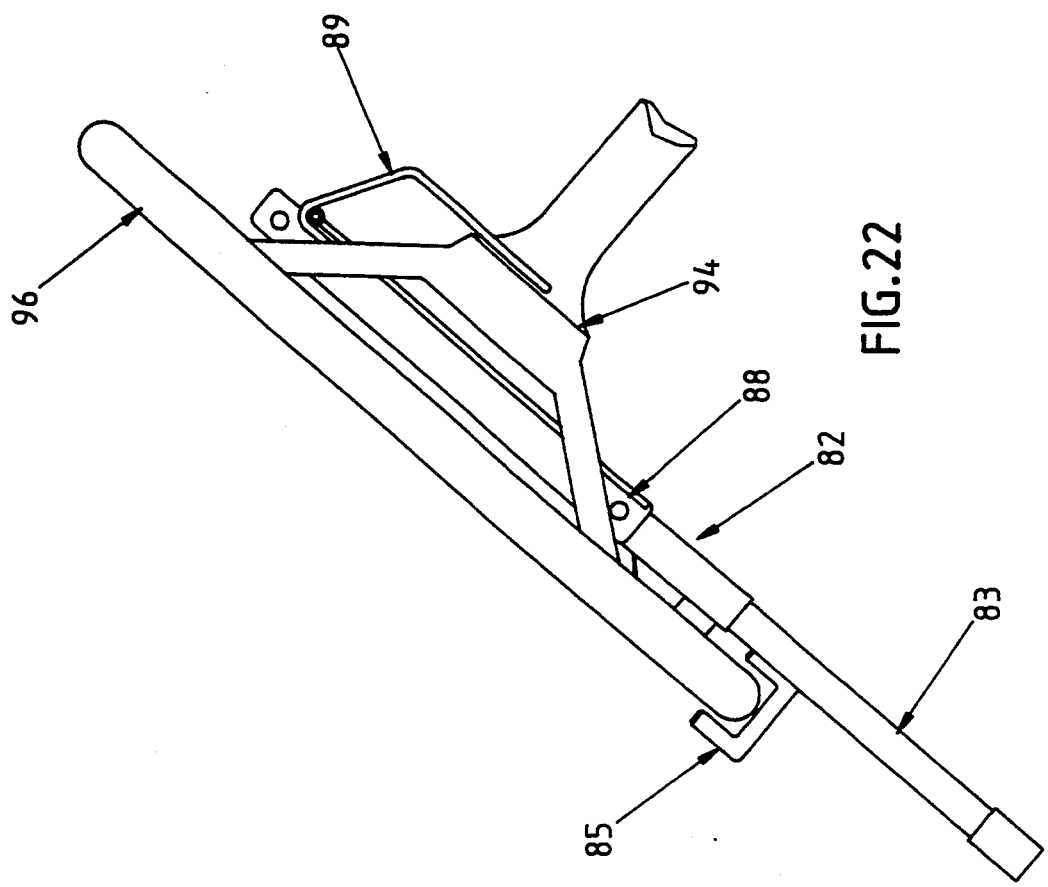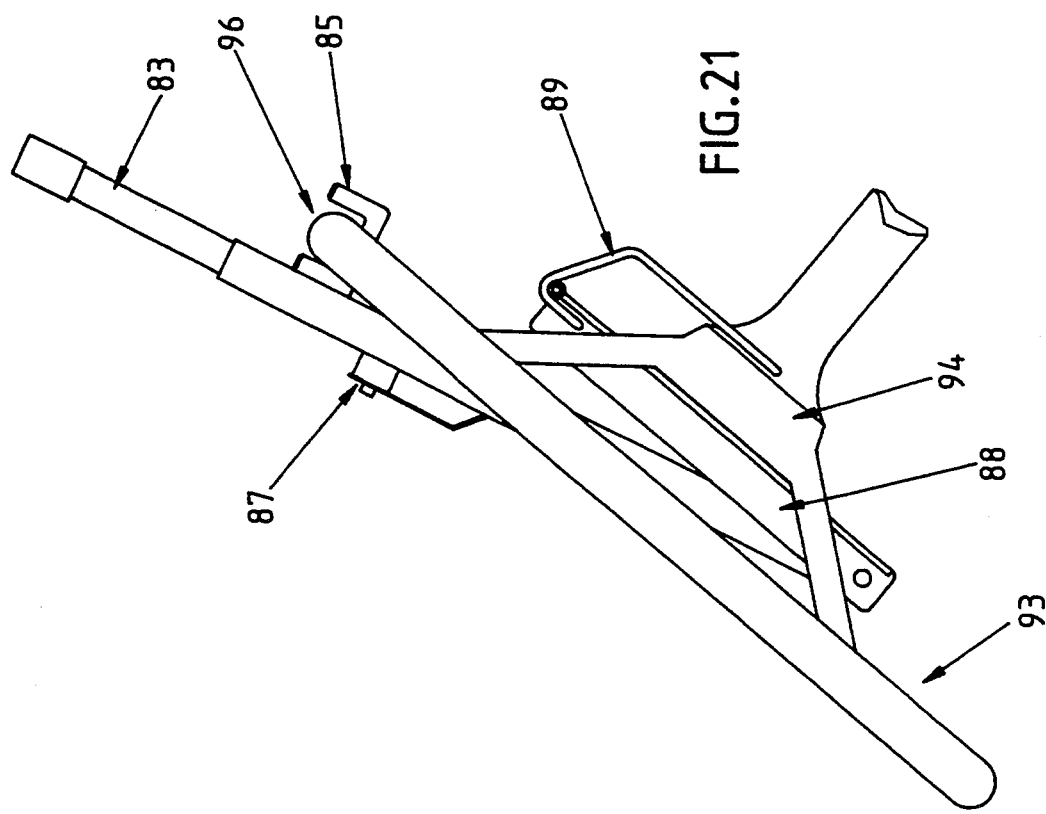

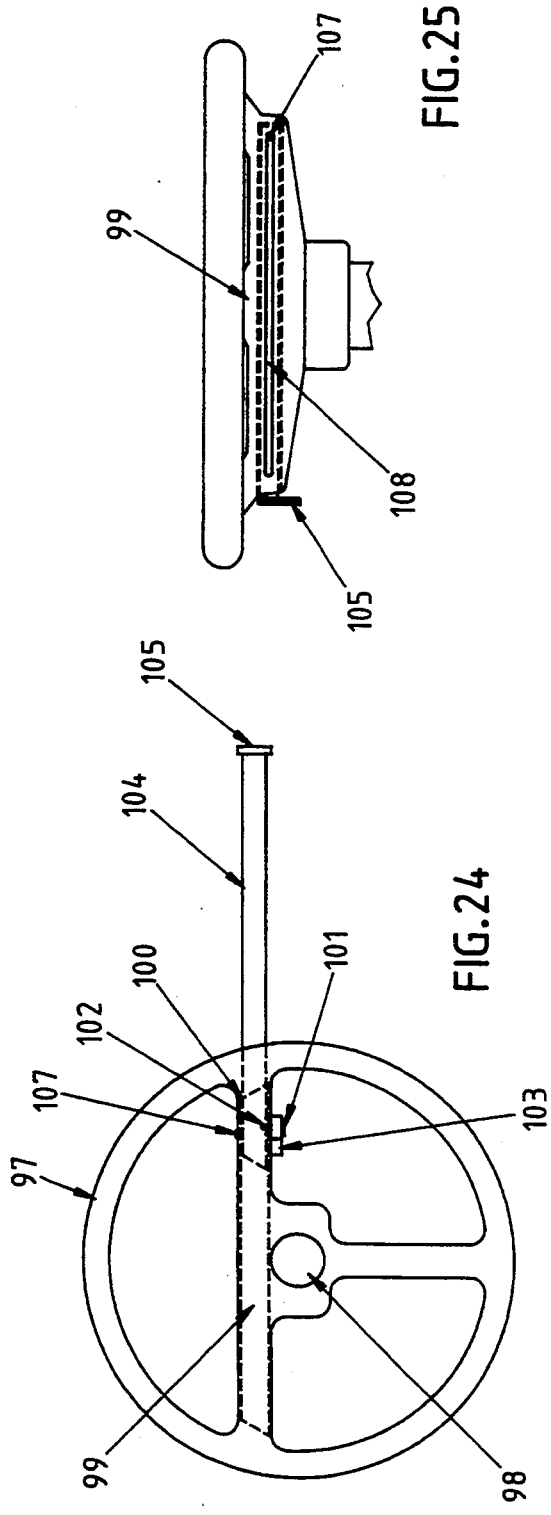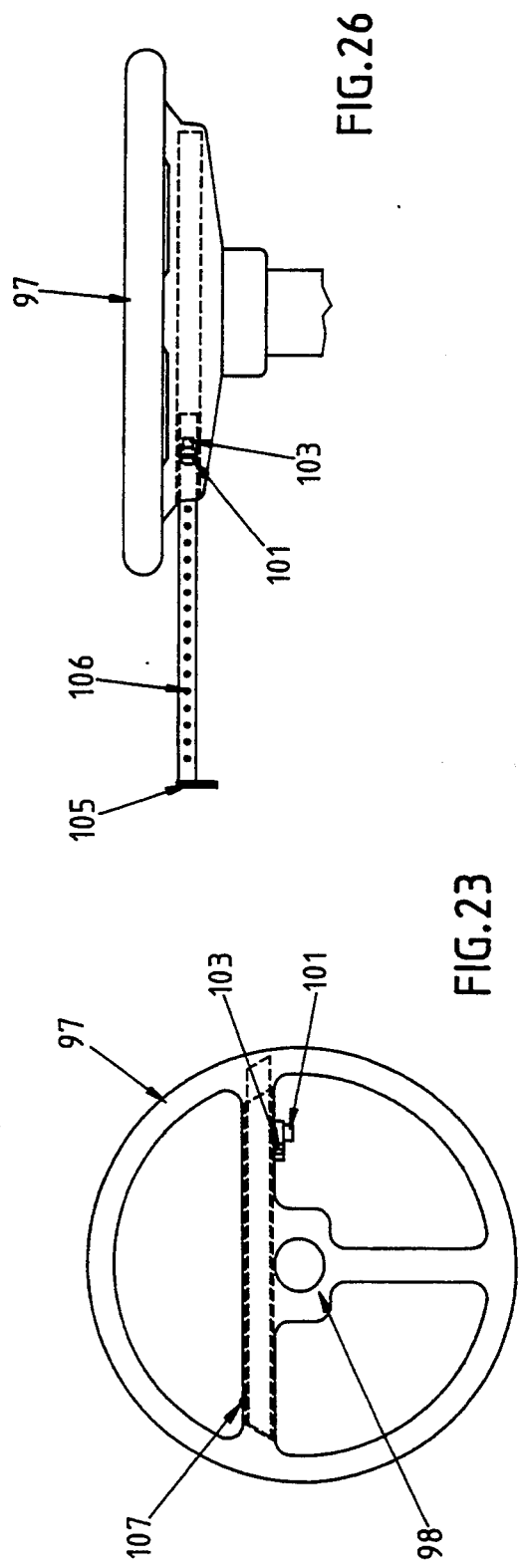

VEHICLE STEERING WHEEL ANTI-THEFT DEVICES

TECHNICAL FIELD

This invention relates to vehicle anti-theft devices and in particular to devices of the type which are adapted to be associated with a vehicle steering wheel so as to prevent or limit rotation thereof.

BACKGROUND ART

A number of different vehicle anti-theft devices of the type which are attachable to a steering wheel are presently known. In one common form, such a device includes two parts which are provided with hooks for engaging opposite diametrical portions of the steering wheel. Such devices normally also include a member or part which extends beyond the periphery of the steering wheel to engage a portion of the vehicle when the wheel is rotated so that rotation of the steering wheel limited and thereby the risks of theft considerably reduced. Examples of such devices are shown in U.S. Pat. Nos. 4,738,127 and 4,970,884. Other devices are attachable between the vehicle steering wheel and a vehicle operating pedal such as a brake pedal as for example devices of the type disclosed in Australian Patent No. 599230. These devices, not only limit wheel rotation, but also prevent operation of the vehicle pedal to which it is secured.

The devices that are presently known are often relatively complex and their locking mechanisms do not provide a desired degree of security. Additionally, the strength and rigidity of some of these devices is limited.

SUMMARY OF THE INVENTION

The present invention aims to provide vehicle security devices for minimizing or reducing the risks of theft of a vehicle. The present invention also aims to provide devices which may be easily fitted to, or associated with a vehicle or vehicle steering wheel and which provide a high degree of security.

The present invention thus provides an anti-theft device for a vehicle adapted to be associated with the steering wheel of said vehicle so as to prevent or limit rotation thereof, said device including a first elongated member a second member associated with said first member and slidably movable longitudinally relative to said first member, one of said members having a series of longitudinally spaced apart apertures therein and the other said member including selectively actuable locking means, said locking means having a locking member adapted when actuated to extend into a selected said aperture so as to lock said first member relative to said second member, one of said members when locked to the other said member having a portion fixed thereto or formed integrally therewith extending in use beyond the periphery of said steering wheel so as to prevent or limit rotation of said steering wheel.

Preferably said locking means includes a selectively actuable push button which when depressed advances the locking member into a selected one of said apertures, the push button preferably includes a key slot for receipt of a key to enable unlocking of said locking means and retraction of said locking member so as to permit said members to move relative to each other. Means are also preferably provided for aligning the locking means and thus the locking member with respective said apertures. Preferably said aligning means includes means adjacent said locking means and engagable with respective apertures as one member is moved relative to the other said member. In one form the aligning means comprises detent means and suitably spring loaded detent means. Most preferably, the detent means comprises a spring loaded ball. The locking means and aligning means where used are preferably Incorporated into a handle of the device.

The associated members include respective steering wheel engaging means adapted in one form to engage opposite portions of the rim of a vehicle wheel. The wheel engaging means preferably are of hooked form to engage the inside of the wheel rim. Suitably the hooks are laterally offset from the axis of the elongated member.

In one preferred form the first elongated member is provided with the series of apertures and the second member comprises a sleeve like member slidable along the first member, the sleeve carrying the locking means.

In a second form the first elongated member is hollow and includes the locking means, and the second member is telescopically receivable in the first member and includes the series of apertures. In this form the first member is slotted to receive the steering wheel engaging means of the second member so as to permit the second member to move longitudinally relative to the first member, movement of the steering wheel engaging means being accommodated by the slot.

In yet a further form the first member comprises a hollow elongated member provided with the series of apertures and the second member includes a sleeve disposed about the first member and carrying the locking means and steering wheel engaging means. Adapted for telescopic movement relative to the first member is an arm coupled to the sleeve, the arm extending in use beyond the rim of the steering wheel.

In yet a further form, the first member is provided with the series of apertures and the second member comprises a sleeve carrying the locking means. The steering wheel engaging means carried by the respective members are adapted to be moved into co-operative engagement with each other to locate about the rim of the steering wheel for locking thereto.

In yet a further form, the first and second member are elongated and telescopically engaged with each other, the members being provided at their free ends with hooked portions for engagement with the vehicle steering wheel and a vehicle operating pedal such as a brake pedal.

In yet a further form, the second member includes an elongated hollow member or sleeve for telescopically receiving the first member, the elongated member including means for engaging a vehicle steering wheel adjacent to its hub and the first member having wheel engaging means adapted to engage the wheel rim and extending beyond the rim.

In yet a further form, the device is incorporated into a vehicle steering wheel, the first member comprising a spoke or chordal member of the wheel and telescopically receiving the second member movable to an extended position to prevent wheel rotation.

In yet a further form, the present invention provides an anti-theft device for a vehicle adapted to be associated with the steering wheel of said vehicle so as to prevent or limit rotation thereof, said device including a first hollow elongated member, a second member associated with said first member and slidably movable longitudinally relative to said first member, and an arm telescopically received in said first member and coupled to said second member for movement therewith, selectively actuable locking means carried by said second member and adapted to be actuated to lock said first member relative to said second member so that said arm extends in use beyond the periphery of said steering wheel so as to prevent or limit rotation of said steering wheel.

BRIEF DESCRIPTION OF THE DRAWINGS

Reference will now be made to the accompanying drawings which illustrate preferred embodiments of the invention and wherein:

FIG. 1 is an isometric view of a first form of anti-theft device according to the invention;

FIG. 2 is a side elevational view illustrating the device of FIG. 1 in a steering wheel engaging attitude;

FIG. 3 illustrates the device of FIGS. 1 and 2 engaged with a steering wheel;

FIGS. 4 and 5 illustrate an alternative embodiment of the invention in an inoperative and operative attitude respectively;

FIG. 6 illustrates an underside view of the device of FIG. 4;

FIG. 7 is a isometric view of a further form of device according to the present invention;

FIGS. 8 and 9 are side elevational views of the device of FIG. 7 in an operative and inoperative attitude respectively;

FIG. 10 is a plan view of the device of FIG. 9;

FIG. 11 is an underside view of the body of the device of FIGS. 8 and 9;

FIGS. 12 and 13 illustrate a further embodiment of the device according to the invention in side view in an operative and inoperative attitude respectively;

FIG. 14 illustrates the device of FIGS. 12 and 13 mounted to a vehicle steering wheel;

FIG. 21 is a side elevational view showing the device of FIG. 18 attached to a vehicle steering wheel;

FIG. 22 illustrates an alternative embodiment of device similar to that of FIG. 18 attached to a steering wheel.

FIGS. 23 and 24 illustrate in an inoperative and operative attitude respectively, an anti-theft device according to the invention incorporated in a steering wheel; and FIGS. 25 and 26 illustrate opposite views of the steering wheel of FIGS. 23 and 24 in an operative and operative attitude respectively.

DETAILED DESCRIPTION OF THE EMBODIMENTS

Figure 15:
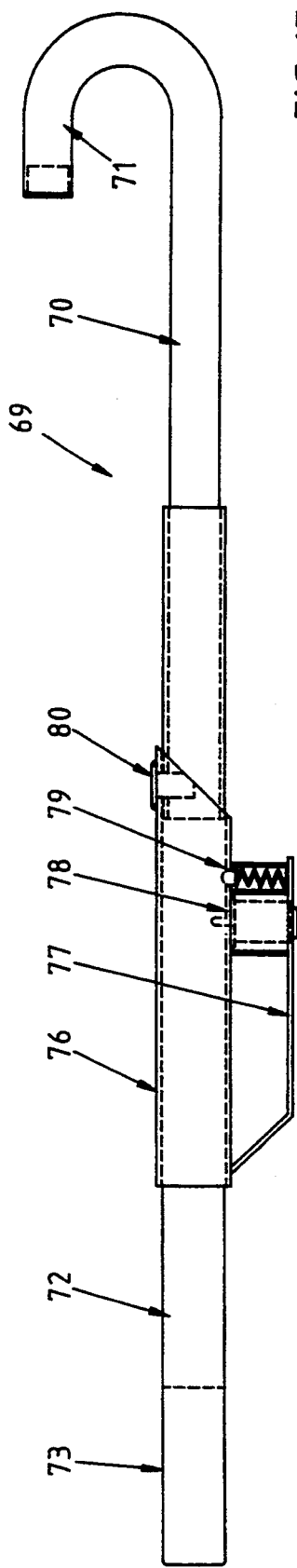
FIGS. 15 and 16 illustrate in top view and side view respectively an alternative anti-theft device according to the invention in an operative and inoperative attitude respectively.

Referring to the drawings and firstly to FIGS. 1 to 3 there is illustrated a first form of anti-theft device 10 according to the present invention adapted for mounting to a vehicle steering wheel to prevent or limit rotation thereof. The device 10 includes an elongated member 11 which is preferably a rolled hollow section of rectangular cross-section and provided at one end with a generally L-shaped nook 12 for engagement with a portion of the rim of a steering wheel and at its opposite end with an abutment region 13 which may be covered with a resilient padding or sleeve 14 so as not to damage an adjacent portion of the vehicle. The member 11 includes in one face a series of longitudinally spaced apertures 15 for a purpose which will hereinafter become apparent.

Located about the member 11 for sliding movement relatively therealong is a sleeve 16, suitably a metal sleeve which carries a further hook 17 of similar form to the hook 12 but facing in the opposite direction. Mounted to the sleeve 16 is a lock 18 manually actuable which comprises a locking member or pin 19 actuable by a push button 20 to extend beyond the inner wall of the sleeve 16 and through a selected aperture 15. The lock 18 incorporates within the push button 20 a key receiving aperture 21 which is adapted to receive a key (not shown) so as to enable unlocking of the lock 18 and retraction of the locking member 19. So as to minimize tampering, the barrel of the lock 18 is located within a hollow housing 22 fixed to the sleeve 16 such as by welding and extending outwardly therefrom. The housing 22 also incorporates a guide tube 23 longitudinally aligned with the apertures 15 which receives a spring 24 and a ball 25 of larger diameter than the diameter of the apertures 15 biased outwardly by the spring 24 to define a detent which serves as a locating and aligning means for the lock 18. The longitudinal spacing between the ball 25 and member 19 is substantially the same as the spacing between respective apertures 15 for a purpose which will hereinafter become apparent. A handle 26 is mounted to the housing 22 and sleeve 16 so as to allow for convenient manual gripping for actuation of the lock push button 20 or sliding of the sleeve 16 along the member 11. The handle 26 is suitably formed of a strip metal and is preferably welded in the housing 22 and sleeve 16.

In use and as shown in FIG. 3 the device 10 is located relative to a steering wheel 27 so as to extend generally diametrically or chordally thereof. One hook, say 12 is located about the steering wheel rim 28 at one position and the handle 26 grasped and the sleeve 16 slid relatively along the member 11 until the hook 17 locates about the rim 28 on the opposite side of the wheel 27. The spring loaded ball 25 will during the sliding movement of the sleeve 16 move or "click" into and out of the respective apertures 15 in ratchet-like fashion to define a detent to position the sleeve 16 such that the lock 18 is aligned in each detent position with one of the apertures 15 as in the FIG. 3 position. The button 20 can then be depressed by hand to cause the locking member 19 to extend into one of the apertures 15 to lock the sleeve 16 and therefore hook 17 against movement relative to the hook 12 so as to lock the device 10 to the wheel 27.

It will be seen from FIG. 3 that the member 11 extends and thus the abutment region 13 is spaced, radially outwardly of the wheel 27 such that if rotation of the wheel 27 is attempted the abutment member 13 will engage an adjacent portion of the vehicle for example, a door or windscreen so that rotation of the wheel 27 is limited, thereby minimizing the risks of vehicle theft. To release the device 10 from the wheel 27, the key is used to unlock the lock 18 and withdraw the member 19 to permit the sleeve 16 to be slid along the member 11 towards the hook 12.

Referring now to FIGS. 4 to 6 there is illustrated an alternative embodiment of anti-theft device 29 according to the present invention. The device 29 includes a hollow elongated tubular member 30 provided at one end with an outwardly directed hook 31 and adapted to receive telescopically a further elongated member 32, the latter being provided with a series of regularly and longitudinally spaced apertures 33. The member 32 includes a padded or resilient region or handle 34 at its free end which facilitates its grip by hand and extension of the member 32 from the member 30 and further serves to prevent damage to the vehicle.

The member 30 is provided on its underside with an elongated slot 35 and extending through the slot 35 for engagement with the member 32 is a further hook 36 which is opposed to the hook 31. Preferably the hook 36 is in threaded engagement with a block 37 located within the member 32 and the slot 35 accommodates movement of the hook 36 longitudinally relative to the member 30. The hook 36 may be locked to the block 37 by means of a 9rub screw engaged through the block 37 with the threaded portion of the hook 36.

Mounted to the member 30 are a handle 37, lock 38 and spring biased detent 39 of similar form and function to those of FIGS. 1 and 2.

In use the device 29 is located diametrically relative to a steering wheel 27 in a similar manner to that shown in FIG. 3 with the hook 31 engaging the wheel rim. The padded region 34 of the member 32 may then be 9rasped so that the member 32 can be extended telescopically from the member 30 until the hook 36 engages or locates about the wheel rim The lock 38 is then actuated to lock the device 29 to the vehicle wheel 27, the detent 39 positioning the lock 38 in alignment with one of the apertures 33. As before, the member 32 and/or handle 34 will prevent or limit rotation of the wheel 27 by contact with a portion of the vehicle to thereby minimize the risks of theft.

FIGS. 7 to 11 illustrate an alternative embodiment of anti-theft device 40 according to the present invention, including in this case an elongated hollow member 41 preferably of rectangular cross-section and provided with a hook 42 at one end, a series of longitudinally spaced apertures 43 in its upper surface and an elongated slot 44 on its underside. A sleeve-like member 45 which may be of channel section form is mounted about the member 41 for slidable movement therealong, the sleeve 45 carrying a handle 46, a lock 47 and spring loaded detent 48 of similar form to that previously described. The sleeve 45 also carries a hook 49 opposed to the hook 42 the hook 49 including a spigot portion 50 which extends through the slot 44, into the interior of the member 41. The slot 44 accommodates longitudinal movement of the hook 49 with the sleeve 45. A further member 51 is telescopically received in the member 41 and is apertured adjacent its inner end so as to be locatable over the spigot 50 to thereby be movable longitudinal with the spigot 50 and thus hook 49 and sleeve 45. The member 51 may include a padded or cushioned portion 52 at its free end.

It will be seen that as the sleeve 45 is moved longitudinally along the member 41 in opposite directions the member 51 will be extended from, and retract into the member 41. In the operative attitude of FIGS. 7 and 8, one hook 42 is suitably engaged with the rim of the vehicle wheel and the sleeve 45 slid along the member 41 until the hook 49 locates about the wheel rim at a position opposite the hook 42. The detent 48 serves to position the sleeve 45 and lock 47 so that actuation of the latter will cause its locking member to move into one of the apertures 43 and lock the sleeve 45 relative to the member 41 so that the member 51 extends outwardly of the vehicle wheel. The member 51 thus prevents or limits rotation of the vehicle wheel.

FIGS. 12 to 14 illustrate an alternative anti-theft device 53 for attachment to a vehicle steering wheel including a first hollow sleeve-like member 54 provided on its underside with an elongated slot 55 and on its top side with a handle 56, lock 57 and spring loaded detent 58. The member 54 further carries at one end a hook 59 of generally arcuate form and hollow in cross-section or hollow in its end. Receivable telescopically in the member 54 is an elongated member 60 which includes a hand grip 61 at one end and a hook 62 at its opposite end which extends through the slot 55 and which is preferably screw engaged at 63 with the end of the member 60 opposite the handle 61. As shown %he hook 62 faces the hook 59 and includes a tongue 64 adapted for receipt in the open end 65 of a hook 59. The member 60 further includes a series of longitudinally spaced and aligned apertures 66 in one face. In use and as shown in FIGS. 13 and 14 the device 53 is located relative to a steering wheel 67 so that the hooked portions 62 and 59 are disposed about opposite sides of the steering wheel rim 68 and so that the member 60 extends beyond the periphery of the wheel 67. The members 60 and 54 may be slid relative to each other so that the hooks 59 and 62 engage about the rim 68 at which point the lock 57 may be actuated as shown in FIG. 12 to engage a selected aperture 66 so that the device 53 is locked to the steering wheel rim 68. In this position the member 60 acts an abutment to prevent or minimize wheel rotation in the manner described above.

In this embodiment, the member 60 may include only one aperture 66 with which the lock 57 is aligned in the FIG. 12 position. In such an arrangement, the detent 58 may be eliminated.

Figure 16:
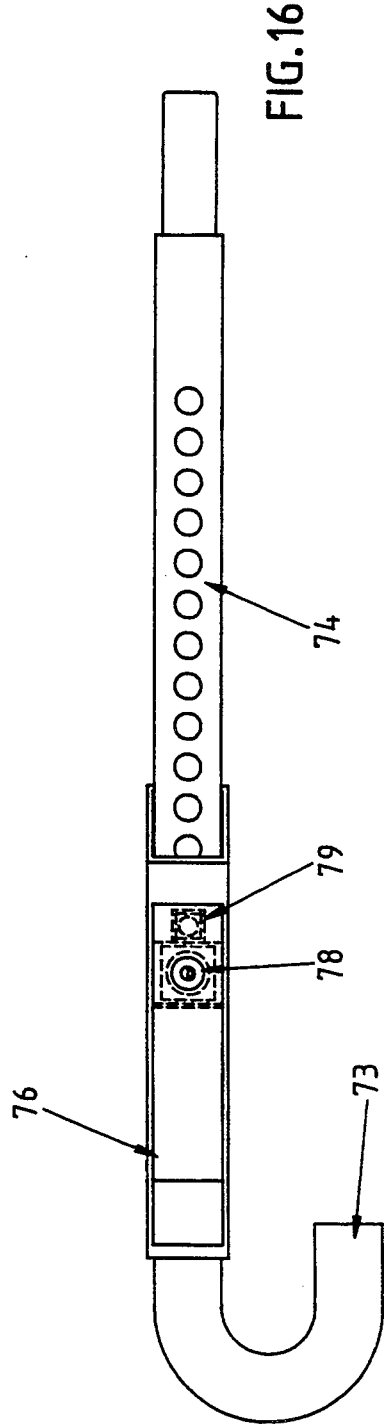
Figure 17:
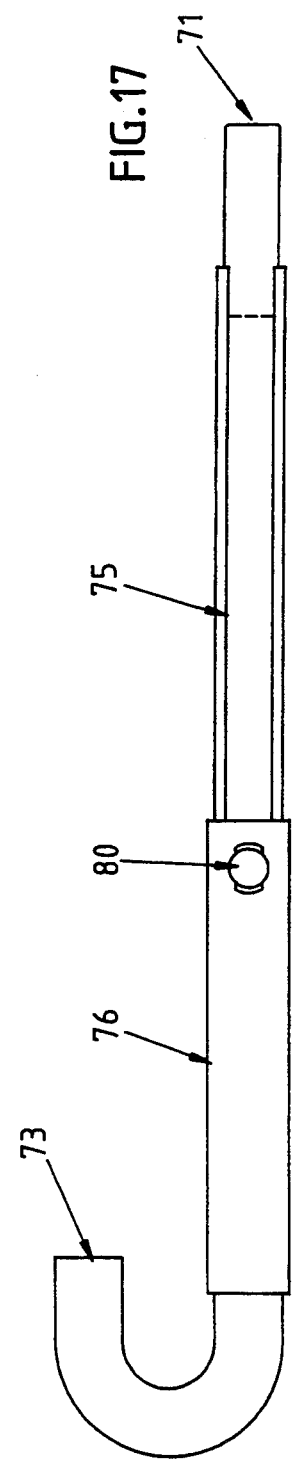
FIG. 17 is an underside view of the device of FIG. 16.
Figure 18:
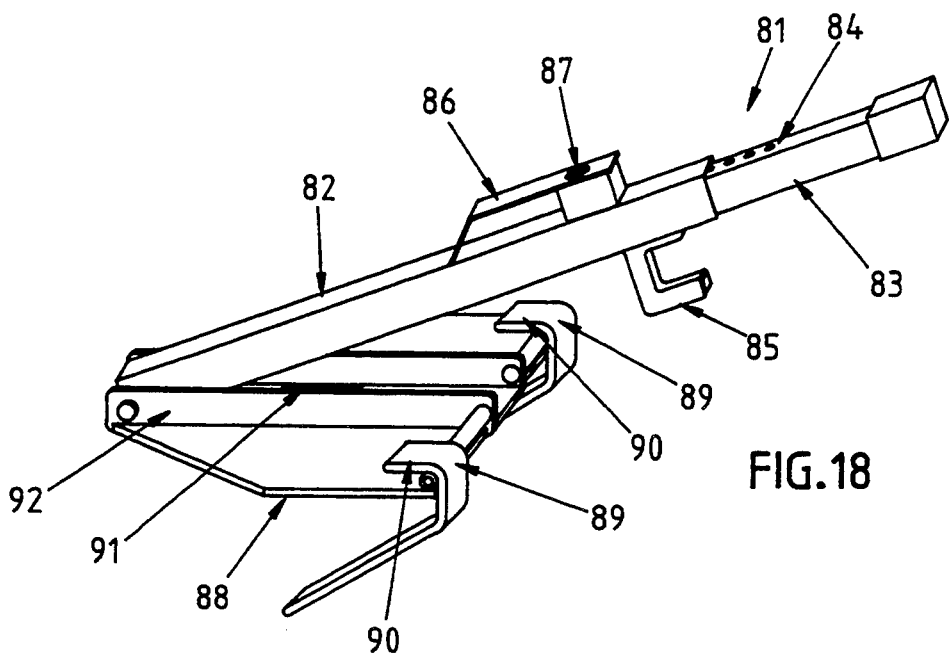
FIG. 18 us a perspective view of a further form of device according to the invention in an operative attitude.

The anti-theft device 69 of the embodiment of FIGS. 15 to 17 is of somewhat similar form to that of FIGS. 7 to 11 except that in this instance the member 70 which is equivalent to the member 51 of FIG. 7 is provided with a hook 71 at its free end whilst the member 72 equivalent to the member 41 of FIG. 7 is provided with an opposing hook 73 arranged at right angles to the hook 71. The member 72 includes on one side a series of apertures 74 and at its opposite side with an elongated slot 75. A sleeve-like housing 76 carries the handle 77, lock 78 and spring loaded detent 79 of similar form to that previously described. The housing 76 is located for sliding movement about the member 72 and is connected through a pin 80 to the member 70, the pin 80 extending through the slot 75 so as to be movable therealong upon longitudinal relative movement of the members 70 and 72.

This device 69 is adapted to be connected between a vehicle pedal; such as a brake pedal and a steering wheel with the respective hooks 71 and 73 being engaged with these components by moving the housing 76 along the member 72 which will either extend or retract the member 70 until a position is reached where the hooks 71 and 73 are securely engaged about the pedal and steering wheel rim. The lock 78 is actuated to lock the hooks 71 and 73 in the securing position. The vehicle steering wheel will thus be prevented from or limited in its rotation and or actuation of the vehicle pedal to which the device 69 is attached will also be prevented.

Referring now to FIGS. 18 to 21 there is illustrated an alternative embodiment of device 81 which has features similar to that of FIGS. 4 to 6, including an elongated tubular member 82 for telescopically receiving an elongated arm 83 which is provided with a series of longitudinally spaced apertures 84 on one side and a hook 85 on its opposite side which projects through a slot on the underside of the member 82 as in FIG. 5. The member 82 includes a handle 86 and lock 87 of the type described previously which permits the member 83 to be extended as desired and locked in position through co-operation between the lock 87 and apertures 84. Pivotally mounted to the free end of the member 82 is a hook mounting support 88 which carries respective spaced apart pivotal hooks 89 facing in a direction opposite the hook 85 and limited in their pivotal movement by stops 90 which are adapted to engage the support 88.

Figure 19:
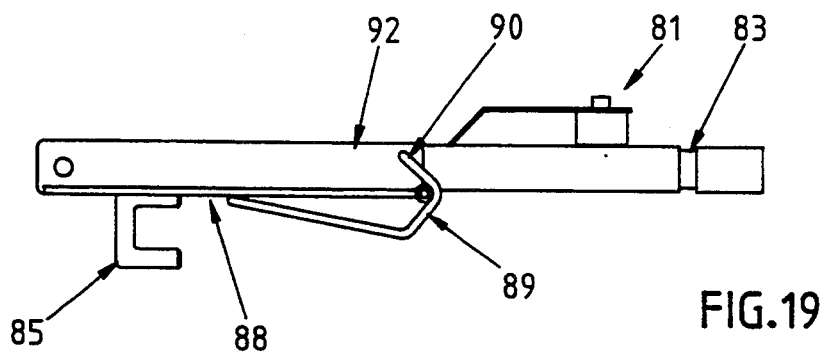
FIG. 19 is a side view of the device of FIG. 18 in an inoperative attitude.

In the inoperative position the arm 83 is retracted within the member 82 and the arm 83 and support 88 move towards each other to the position of FIG. 19. The support 88 for this purpose is Blotted at 91 to receive the member 82 and a pair of flanges 92 are disposed on opposite sides of the slot to strengthen the support 88. As shown, the end of the member 82 is connected to the support 88 by being pivotally connected between the flanges 92.

Figure 20:
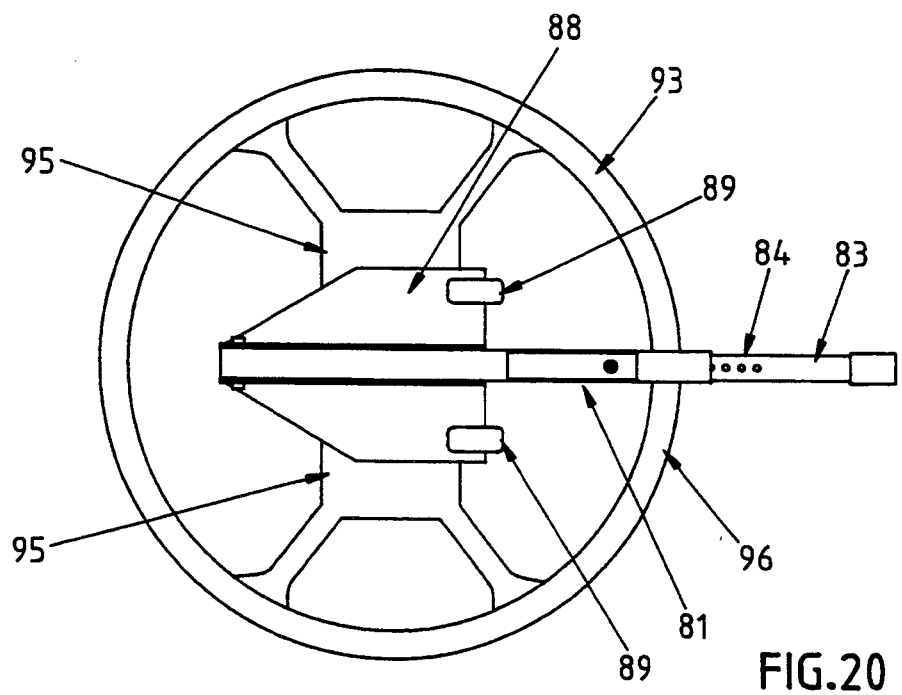
FIG. 20 is a plan view illustrating the device of FIGS. 18 and 19 mounted to a vehicle steering wheel.

For attachment to a steering wheel 93 as shown in FIGS. 20 and 21 the support 88 is located adjacent the steering wheel hub 94 so that the hooks 89 engage with the steering wheel spokes 95 or alternatively under the steering wheel hub 94, engagement of the hooks 89 being ensured by the limitation of pivotal movement thereof provided by the stops 90. The member 83 is then extended until the hook 85 engages the rim 96 of the steering wheel 93 at which position the lock 87 is actuated to lock the member 83 in the extended position shown, this thereby limiting rotation of the steering wheel.

In both of the embodiments of FIGS. 18 to 21 and 22, the support 88 is located over the wheel hub 94 so that access to the nut which holds the hub 94 to the steering column is prevented to add a further degree of security.

In the embodiment of FIG. 22 the hook mounting support 88 is arranged in a reverse configuration and the hook 85 pointed in the opposite direction. The opposing hooks 85 and 89 then co-operate to be engaged with the rim 96 and hub 94 (or spokes 95) respectively, the hook 85 in this arrangement engaging with the rim 46 from the outside.

Referring now to FIGS. 23 to 26 there is illustrated a steering wheel 97 incorporating an anti-theft device according to the present invention. The steering wheel 97 includes a central hub 98 and a chordally extending spoke 99 which in this embodiment is hollow and which is open at least one end 100. The spoke 99 carries a locking mechanism 101 for actuating a locking member 102 in a similar manner to that previously described. Also disposed adjacent the locking mechanism 101 is a spring loaded detent 103. Both the locking mechanisms 101 and detent 103 are of the type previously described. Telescopically received within the hollow spoke 99 is an arm 104 provided with a padded grip 105 at its free end. The arm 104 is preferably of hollow form and provided with a series of longitudinally spaced apertures 106 arranged on the same side as the locking mechanism 101. The arm 104 also carries on its side opposite the apertures 106 an outwardly extending pin 107 which projects through an elongated slot 108 in the spoke 99, the pin 107 being movable along the slot 108 during telescopic movement of the arm 104.

In use the grip 105 is simply grasped by hand and extended outwardly of the steering wheel 97 to the position shown in FIGS. 24 and 26. The locking mechanism 101 may then be actuated so that the locking member 102 projects into one of the apertures 106 to lock the arm 104 in extended position and thereby prevent or limit rotation of the steering wheel. Co-operation between the pin 107 and slot 108 limits the outward and inward movement of the arm 104 relative to the spoke 99. In the retracted position, the arm 104 is retracted into the spoke 99 and thereby hidden from view.

In each of the embodiments described above the lock is preferably disposed in a housing which is preferably formed of case hardened metal to minimize the risks of tampering. Similarly the spring loaded detent is also substantially enclosed within the housing such as to prevent tampering. The lock is additionally designed in such a manner that if drilling out of the key slot is attempted the lock barrel will tend to rotate in an unrestrained manner so that the drill bit cannot bite into the surrounding metal.

To further increase security and prevent tampering with the lock, it may be arranged within a square or rectangular sectioned housing which also accommodates the push button. Located above the push button is a washer type member of circular form and a square or rectangular further washer of similar peripheral form to the cross-section of the housing but movable up and down therein. The washers are restrained within the housing and over the push button by an apertured cover secured to the top of the housing.

The aperture in the cover permits the finger to be inverted to engage the top washer and thereby allows depression of the lock push button. The holes in the washers are of sufficient size to prevent key insertion but not large enough to permit a drill or similar object to drill out the entire barrel of the lock. Larger drills will foul against the apertures in the washers and either jamb in the aperture in the square sectioned washer (which may be case hardened) or engage and rotate the circular washer and thereby be prevented from drilling into the lock barrel. If desired springs may be incorporated into the hollow members of the devices of FIG. 4, 7, 18 and 24 to assist in extending the respective wheel rotation limiting arms, the springs being adapted to urge those arms outwardly of their hollow housings.

The components of the anti-theft devices of the invention are all preferably constructed of a metal which may be treated with a corrosion inhibitor or alternatively comprise a corrosion resistant metal. The portions of the devices which contact the steering wheel of the vehicle are preferably padded to minimize the risks of damage to a vehicle. The components of the devices whereof tubular form may be circular, square or any other form in cross-section and may comprise fully closed tubular members or only part closed members such as C- or channel shaped members. The slots for accepting the hooks may be defined by C-sectioned members.

Whilst the preferred form of locking device for locking the members relative to each other preferably comprises a device having a locking member insertable into an aperture of a series of apertures, other locking mechanisms may be employed as will be apparent in the art.

I claim:

1. An anti-theft device for a vehicle adapted to be associated with the rim of a steering wheel of said vehicle so as to prevent or limit rotation of said steering wheel, said device including a first elongated hollow member, said member having a length of at least the diameter of said steering wheel so that said first hollow member may extend diametrically between opposite sides of said steering wheel rim, a second elongated member telescopically received within said first member and slidably movable longitudinally relative to said first member and outwardly from one end of said first member, said first member having first steering wheel engagement means at its end opposite said one end for engaging the rim of said steering wheel from the inside thereof, second steering wheel engagement means supported for movement with said second member and adapted to engage said wheel rim from the inside thereof at a position opposite said first engagement means when said second member is extended from said first member, one of said members having a series of longitudinally spaced apart apertures therein, and selectively actuable locking means supported by the other said member, said locking means having a locking member adapted when actuated to extend into a selected said aperture so as to lock said first member relative to said second member to hold said first and second steering wheel engagement means in a position in engagement with said steering wheel rim, said second member in said position extending beyond the rim of said steering wheel so as to prevent or limit rotation of said steering wheel.

2. A device according to claim 1 wherein said locking means includes a selectively actuable push button which when depressed advances said locking member into a selected one of said apertures.

3. A device according to claim 2 wherein said push button includes a key slot for receipt of a key for unlocking of said locking means and retraction of said locking member so as to permit said first and second members to move relative to each other.

4. A device according to claim 1 and including means for aligning said locking means and said locking member with respective said apertures.

5. A device according to claim 4 wherein said aligning means includes means adjacent said locking means and engageable with respective said apertures as one said member is moved relative to the other said member.

6. A device according to claim 5 wherein said aligning means comprises spring loaded detent means.

7. A device according to claim 6 wherein said detent means comprises a spring loaded ball.

8. A device according to claim 1 wherein said wheel engagement means comprise hooks.

9. A device according to claim 8 wherein said first and second members have a common longitudinal axis and wherein said hooks are laterally offset from said axis.

10. A device according to claim 1 wherein said first elongated member supports said locking means and wherein said second member includes said series of apertures.

11. A device according to claim 10 wherein said first member includes a longitudinally extending slot and wherein said second steering wheel engagement means of said second member is accommodated by said slot.

12. A device according to claim 11 wherein said slot is closed at each end to limit longitudinal movement of said second steering wheel engagement means and prevent detachment of said first and second members.

13. A device according to claim 10 wherein said locking means includes a lock body and wherein a housing extends outwardly from said first member, said lock body being located within said housing.

14. A device according to claim 13 and including a raised gripping handle, said handle having a first end secured to said housing and a second end secured to said first member.

15. A device according to claim 1 wherein said first member is provided with said series of apertures and wherein a sleeve is disposed about said first member and carries said locking means, said second member being connected to said sleeve for movement therewith.

16. A device according to claim 15 wherein said first member includes an elongated slot and wherein connecting means connect said second member and said sleeve and extend through said slot, said slot permitting movement of said connecting means along said slot.

17. A device according to claim 10 wherein said slot is closed at least at its end adjacent said one end of said first member and wherein said connecting means cooperates with said one end of said slot to prevent detachment of said first and second members.

18. A device according to claim 16 wherein said locking means includes a lock body and wherein a housing extends outwardly from said sleeve, said lock body being located within said housing.

19. A device according to claim 18 and including a raised gripping handle, said handle having a first end secured to said housing and a second end secured to said sleeve.

20. An anti-theft device for a vehicle adapted to be associated with the rim of a steering wheel of said vehicle so as to prevent or limit rotation of said steering wheel, said device including a first elongated hollow member, said member having a length of at least the diameter of said steering wheel so that said first hollow member may extend diametrically between opposite sides of said steering wheel rim, a second elongated member telescopically received within said first member and slidably movable longitudinally relative to said first member and outwardly from one end of said first member, said first member having first steering wheel engagement means at its end opposite said one end for engaging the rim of said steering wheel from the inside thereof, a third hollow member surrounding said first hollow member and movable longitudinally therealong, an elongated slot extending longitudinally along said first member, means interconnecting said third member and said second member and passing through said slot, said interconnecting means being movable along said slot, second steering wheel engagement means on said third member and adapted to engage said wheel rim from the inside thereof at a position opposite said first engagement means when said second member is extended from said first member, said first member having a series of longitudinally spaced apart apertures therein, and selectively actuable locking means supported on said third member, said locking means having a locking member adapted when actuated to extend into a selected said aperture so as to lock said third member and thus said second member against movement relative to said first member to hold said first and second steering wheel engagement means in a position in engagement with opposite portions of said steering wheel rim, said second member in said position having a portion extending beyond the rim of said steering wheel so as to prevent or limit rotation of said steering wheel.

21. A device according to claim 20 wherein said slot is closed at at least its end adjacent said one end of said first member to limit movement of said interconnecting means and to prevent detachment of said first and second members.

22. A device according to claim 20 wherein said locking means includes a lock body, and wherein said third member includes a housing accommodating said lock body, and a handle having one end fixed to an outer portion of said housing and its other end fixed to said third member.

23. An anti-theft device for a vehicle adapted to be associated with the rim of a steering wheel of said vehicle and a vehicle pedal so as to prevent or limit rotation of said steering wheel, and operation of said pedal, said device including a first elongated hollow member, a second elongated member telescopically received within said first member and slidably movable longitudinally relative to said first member and outwardly from one end of said first member, said first member having first engagement means at its end opposite said one end, a third hollow sleeve member surrounding said first hollow member and movable longitudinally therealong, an elongated slot extending longitudinally along said first member, means interconnecting said third member and said second member and passing through said slot, said interconnecting means being movable along said slot, second engagement means on said second member, said first member having a series of longitudinally spaced apart apertures therein, and selectively actuable locking means supported on said third member, said locking means having a locking member adapted when actuated to extend into a selected said aperture so as to lock said third member and thus said second member against movement relative to said first member to hold said first and second engagement means in a fixed relationship relative to each other, one of said engagement means being adapted to engage the rim of said steering wheel and the other said engagement means being adapted to engage a vehicle pedal of said vehicle whereby when said first and third members are locked to each other, said device prevents or limits rotation of said steering wheel and operation of said vehicle pedal.

* * * * *